(12) United States Patent
Karandikar et al.

(10) Patent No.: US 9,778,732 B2
(45) Date of Patent: Oct. 3, 2017

(54) INTELLIGENT ELECTRONIC DEVICE WITH POWERING OPTIONS FOR THE DISPLAY WHEN NOT IN USE

(71) Applicant: ABB Technology AG, Zurich (CH)

(72) Inventors: Harshavardhan M. Karandikar, Longwood, FL (US); Douglas Voda, Sanford, FL (US); Cleber Angelo, Maitland, FL (US); K. Brent Binkley, Lake Mary, FL (US); Indrajit Jadhav, Coral Springs, FL (US)

(73) Assignee: ABB Schweiz AG, Baden (CH)

( * ) Notice: Subject to any disclaimer, the term of this patent is extended or adjusted under 35 U.S.C. 154(b) by 155 days.

(21) Appl. No.: 14/624,762

(22) Filed: Feb. 18, 2015

(65) Prior Publication Data

US 2016/0239078 A1  Aug. 18, 2016

(51) Int. Cl.
*G06F 1/32* (2006.01)
*G06F 1/10* (2006.01)
*G09G 3/34* (2006.01)

(52) U.S. Cl.
CPC .............. *G06F 1/3296* (2013.01); *G06F 1/10* (2013.01); *G09G 3/3406* (2013.01);
(Continued)

(58) Field of Classification Search
CPC ......... G01R 11/24; G06F 1/10; G06F 1/3296; G09G 2320/043; G09G 2330/021;
(Continued)

(56) References Cited

U.S. PATENT DOCUMENTS 4,792,783 A * 12/1988 Burgess ................. B60K 35/00
307/10.1
5,969,433 A * 10/1999 Maggiora ............... B60R 25/04
180/287
(Continued)

FOREIGN PATENT DOCUMENTS

CN     103163343 A     6/2013
JP     2008302901 A * 12/2008 ............... G02F 1/13

OTHER PUBLICATIONS

International Search Report & Written Opinion in PCT/US2016/018172 dated May 18, 2016.

*Primary Examiner* — Thomas Lee
*Assistant Examiner* — Chad Erdman
(74) *Attorney, Agent, or Firm* — Manelli Selter PLLC; Edward J. Stemberger

(57) ABSTRACT

An assembly includes a cabinet having an interior and a door to gain access to the interior. An intelligent electronic device (IED) is within the interior of the cabinet and includes inputs providing electrical connections to the IED, pushbuttons to provide user input to the IED, a display module including a display, a component, and a timer circuit. The timer circuit powers the component OFF or places it in a reduced power state when not in use after a certain amount of time. A switch is associated with the door and is electrically connected to at least one of the inputs so that when the display module is powered OFF or in the reduced power state and when the door is opened, the switch causes a signal to be sent to the timer circuit to cause the timer circuit to power the component fully ON.

16 Claims, 2 Drawing Sheets

(52) U.S. Cl.
CPC . *G09G 2320/043* (2013.01); *G09G 2330/021* (2013.01); *G09G 2330/022* (2013.01); *G09G 2330/027* (2013.01)

(58) Field of Classification Search
CPC ....... G09G 2330/022; G09G 2330/027; G09G 3/3406; H05K 7/1481
See application file for complete search history.

(56) References Cited

U.S. PATENT DOCUMENTS

| | | | | |
|---|---|---|---|---|
| 6,687,627 | B1 * | 2/2004 | Gunn | G01R 21/133 |
| | | | | 324/500 |
| 2005/0145774 | A1 | 7/2005 | Yang et al. | |
| 2008/0276109 | A1 | 11/2008 | Yoshida | |
| 2013/0169269 | A1 * | 7/2013 | Bickel | G01R 19/2513 |
| | | | | 324/126 |
| 2013/0274972 | A1 * | 10/2013 | Kusumi | B60L 1/003 |
| | | | | 701/22 |
| 2014/0125316 | A1 | 5/2014 | Ramirez | |
| 2014/0143567 | A1 * | 5/2014 | Anderson | G06F 1/3228 |
| | | | | 713/323 |
| 2014/0184046 | A1 * | 7/2014 | Park | A47B 96/20 |
| | | | | 312/234 |
| 2016/0197987 | A1 * | 7/2016 | Lee | H04L 67/16 |
| | | | | 709/204 |

\* cited by examiner

INTELLIGENT ELECTRONIC DEVICE WITH POWERING OPTIONS FOR THE DISPLAY WHEN NOT IN USE

FIELD

The invention relates to Intelligent Electronic Devices (IEDs) that are used outdoors in power transmission and distribution networks and, more particularly, to a display of the IED that is powered off or put in a reduced power mode when not in use and can be powered on when needed.

BACKGROUND

Microprocessor based protection and control relays (also called IEDs) that are used in the transmission and distribution network nowadays typically come with a LCD display. While most IEDs are used in electrical substations that have a controlled environment, some are used in non-controlled, outdoor environments. These relays and the components inside them can be subjected to wide swings in temperature as well as extremes of temperature on a daily basis. These extremes are known to cause failures of the continuously powered LCD display module over time. Such failures are bothersome in recloser applications as the cost to repair is high due to the nature of installation of these devices (in a widely distributed area and near high voltage power lines).

It is possible to overcome the above limitation by using higher grade components. However, this adversely impacts the cost of the LCD display module.

Thus, there is a need to extend the life of a display in an IED used outdoors by powering the display off or by reducing power thereto when not in use.

SUMMARY

An objective of the invention is to fulfill the need referred to above. In accordance with the principles of the present invention, this objective is achieved by providing an assembly including a cabinet having an interior and a door movable between open and closed positions to gain access to the interior. An intelligent electronic device (IED) is disposed within the interior of the cabinet and includes inputs providing electrical connections to the IED, pushbuttons constructed and arranged to provide user input to the IED, a display module including a display, a component associated with the display, and a timer circuit associated with the component of the display module. The timer circuit is constructed and arranged to power the component OFF or place the component in a reduced power state when not in use after a certain amount of time. A switch is associated with the door and is electrically connected to at least one of the inputs so that when the component is powered OFF or in the reduced power state, and when the door is opened, the switch is constructed and arranged to cause a signal to be sent to the timer circuit to cause the timer circuit to power the component fully ON. The component, for example, can be a backlight for the display or a controller.

In accordance with another aspect of an embodiment, a method of controlling power to an intelligent electronic device (IED) provides the IED in a cabinet. The cabinet has a door to gain access to the IED. The IED is provided to have inputs providing electrical connections to the IED, pushbuttons constructed and arranged to provide user input to the IED, and a display module including a display and a component associated with the display. The component is caused to be powered OFF or to be in placed in a reduced power state when not in use after a certain amount of time. When the component is powered OFF or in the reduced power state, the component is caused to be powered fully ON upon opening of the door of the cabinet.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWING

The invention will be better understood from the following detailed description of the preferred embodiments thereof, taken in conjunction with the accompanying drawings wherein like numbers indicate like parts, in which.

DETAILED DESCRIPTION OF THE EXEMPLARY EMBODIMENTS

Figure 1:
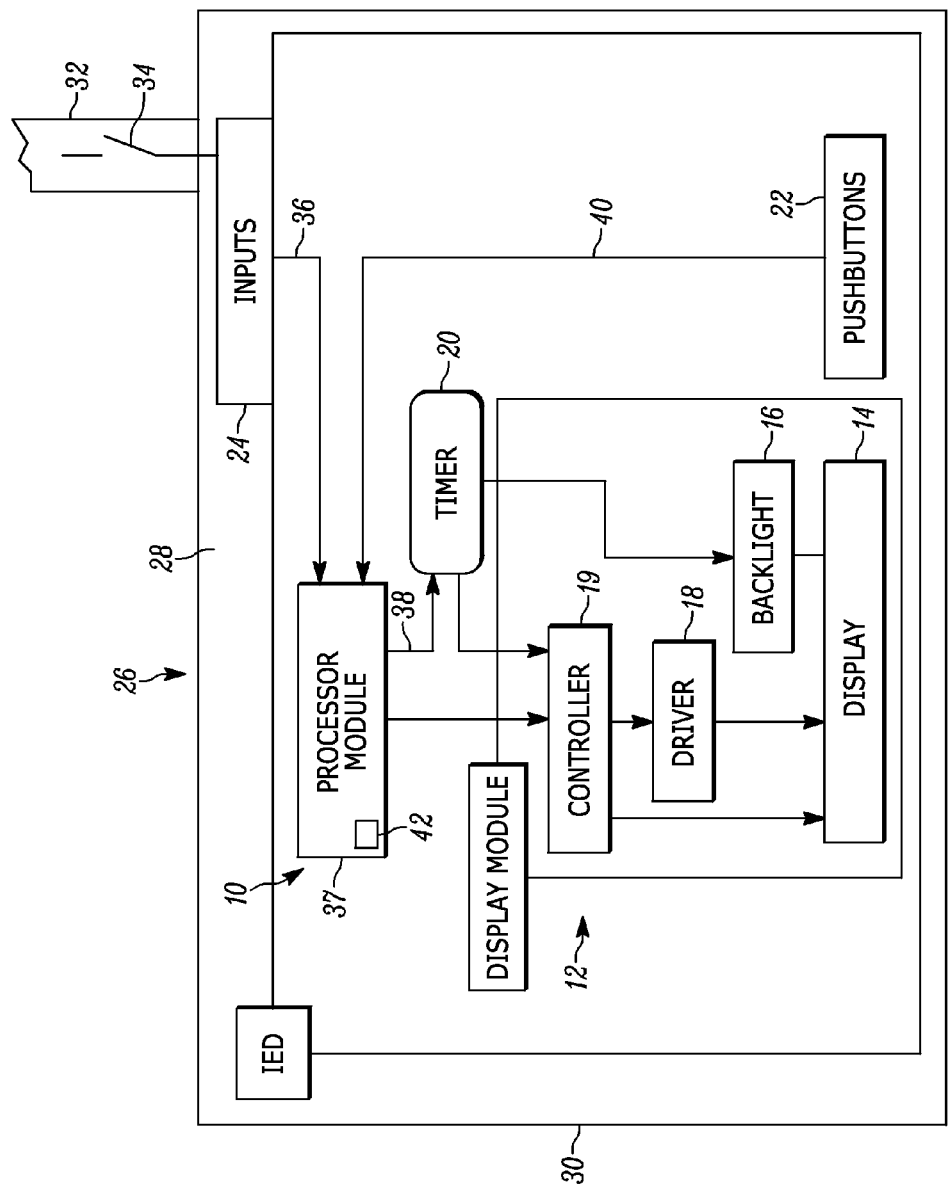
FIG. 1 is a view of an IED assembly, in accordance with an embodiment, including an IED mounted in a cabinet, with a door of the cabinet including a switch that powers the backlit IED display fully ON when the door is opened.

With reference to FIG. 1, a microprocessor based protection and control relay (also called Intelligent Electronic Device (IED)) is shown, generally indicated at 10, for use in outdoor electrical distribution applications. The IED 10 can be of the conventional type such as the ABB RER620 having a display module, generally indicated at 12, a display 14, a backlight 16 for the display 14, a driver 18, a control circuit or controller 19 associated with the display 14 and with the driver 18. The display 14 is preferably a liquid crystal display (LCD) type, but can be of any type of display that uses backlighting. A timer circuit 20 is electrically connected with components of the display module 12, in particular, with the backlight 16 and with the controller 19. Manually actuated pushbuttons 22 are provided at the front of the IED 10 for user input to the IED. A plurality of electrical inputs 24 (analog and binary) is provided at the rear of the IED 10 for connecting sensors or other devices to the IED.

Unlike use in electrical substations, when the IED 10 is used for outdoor applications such as outdoor breakers and reclosers, it exists in a non-controlled outdoor environment. Thus, the relays and the components inside the IED 10 can be subjected to extremes of temperature as well as wide temperature swings. These extremes are known to cause failures of the continuously powered, conventional LCD display module 12. While the conventional IED 10 is in operation, and thus the display module 12 is powered, the module 12 can typically withstand ambient temperatures in the range −20 to +70° C. This is typical for a normal industrial application LCD display module. Special modules, such as those hardened for military use can withstand higher temperatures.

The LCD display module 12 in a non-powered state sitting in the same environment is in what is considered to be "storage" mode. In the storage mode, the LCD module 12 can withstand higher temperatures, such as −40 to +85° C.

Thus, in a non-powered state, the display module 12 can withstand higher temperatures and have a longer life. For a recloser application, the user rarely interacts with the IED 10, once installed. Conventionally, the relay 10 sits in a control cabinet somewhere on the feeder. A user/technician may visit it once a year, or upon an occurrence of fault. As a result, there is no need to continuously power the display module 12, extending its life. Thus, in accordance with the embodiments, components of the display module 12 can be completely powered down or can be put in a low power state when not in use beyond a certain time period. The shutdown is achieved in the IED 10 such as in the timer circuit 20 which powers off the backlight 16 (FIG. 1) or by the timer circuit 20 that powers off, or places the controller 19 is a low power state (FIG. 2), as will be explained more fully below.

Returning to FIG. 1, in accordance with an embodiment, the IED 10 is part of an assembly, generally indicated at 26. The assembly 26 includes the IED 10 provided in an interior 28 of a cabinet 30. The cabinet 30 is constructed and arranged for use in outdoor environments and includes a door 32, movable between open (FIG. 1) and closed (not shown) positions for gaining access to the interior 28 and thus to the IED 10. The door 30 can be located at any desirable position on the cabinet 30. A switch 34 is associated with the door 32 that activates when the door 32 is opened. The switch 34 is electrically connected to one of the inputs 24 of the IED 10. Thus, when the door 32 is opened, the display module 12 either awakens from a sleep mode (reduced power state) or preferably, is turned fully ON. In particular, opening the door 32 triggers the switch 34 that causes a signal 36 to be sent from the input 24 to a processor module 37, which in turn sends a signal 38 to the timer circuit 20 to turn the backlight 16 ON. The switch 34 can be of any type, mechanical, optical, capacitive, etc.

The backlight 16 of the display module 12 can be activated, e.g., powered ON from an OFF condition or woken-up, under two circumstances:

1. When a user opens the door 32 of the cabinet 30 that contains the IED 10, the backlight 16 is automatically fully energized. This is accomplished by means of the interlock switch 34 causing the signal 36 to be sent to the timer circuit 20 via the processor module 37 to the backlight 16.
2. When a user of the IED 10 pushes any of the pushbuttons 22 on the front panel of the IED, a signal 40 is received by the processor module 37 which sends signal 38 to the timer circuit 20 to turn the backlight 16 fully ON. This feature can be used to turn the backlight 16 back ON when the door 32 is left open for a period of time and the backlight 16 had automatically been turned OFF.

The interlock switch 34 can be of many types. Two example implementations are:

1. The recloser control cabinet 30 also called as Low Voltage (LV) cabinet already has a conventional toggle switch (like the ones used in a refrigerator to control the light) that is triggered by the door opening. The output of the conventional switch is connected to the IED 10 and is used for intrusion detection. Thus, when an unauthorized person opens the door, a signal is sent to a control center (e.g., via SCADA), and an alarm is triggered. In accordance with an embodiment, this toggle switch can now also be used to send signal 36 to the processor module 37 and thus the timer circuit 20 to turn the backlight 16 ON. Alternatively, a switch 34, separate from the toggle switch, can be provided to turn the backlight 16 ON as noted above.
2. A photocell that detects the opening of the cabinet door 32 and sends a signal to the processor module 37 and thus the timer circuit 20 that triggers the power up of the backlight 16.

Figure 2:
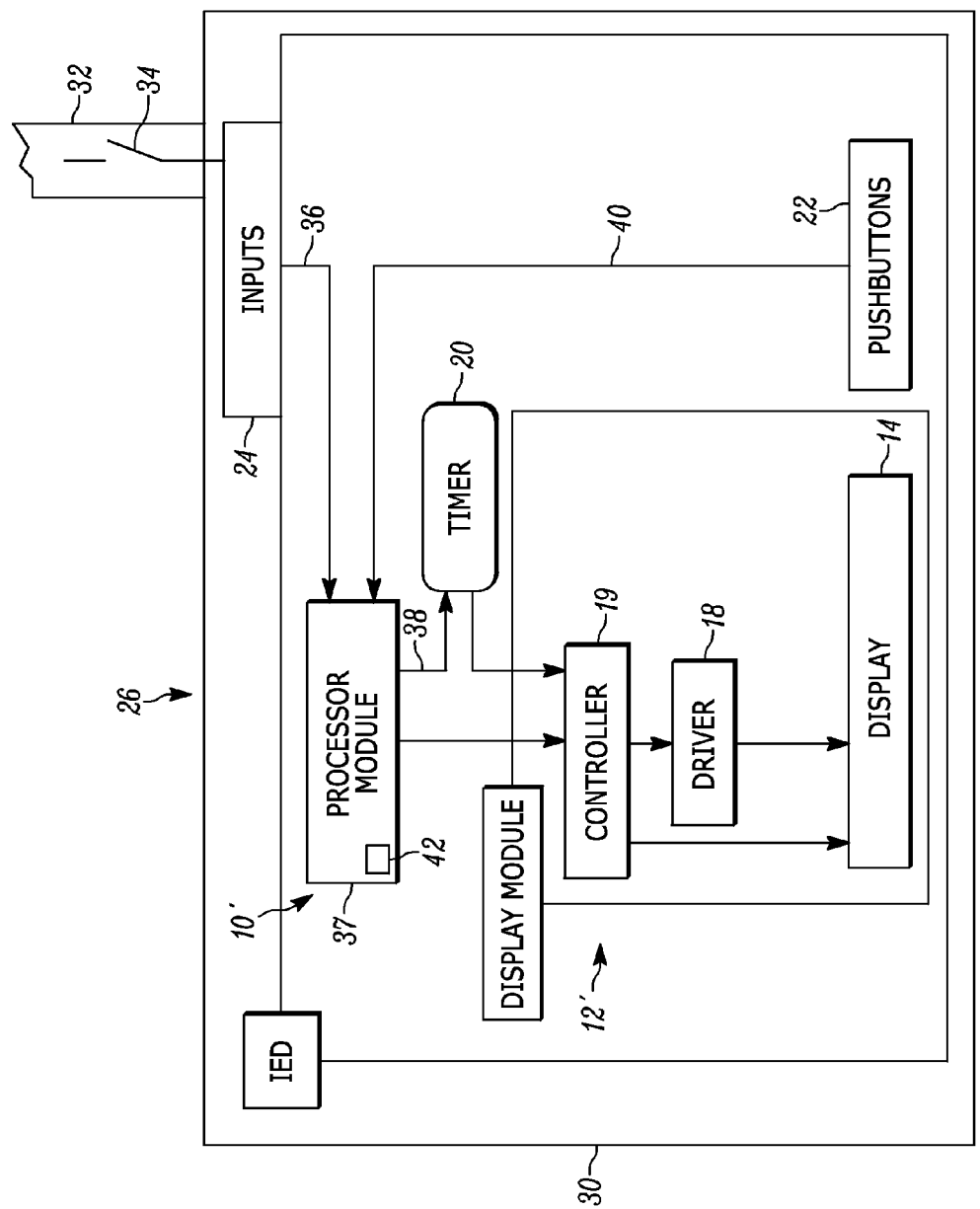
FIG. 2 is a view of an IED assembly, in accordance with another embodiment, including an IED mounted in a cabinet, with a door of the cabinet including a switch that powers a controller fully ON when the door is opened.

In accordance with another embodiment as shown in FIG. 2, the IED 10' is part of an assembly, generally indicated at 26'. The assembly 26' includes the IED 10' provided in an interior 28 of a cabinet 30. The IED 10' is similar to that of FIG. 1, but the display module 12' of FIG. 2 does not include the backlight 16 of the embodiment of FIG. 1. Thus, when the door 32 is opened, the controller 19 of the display module 12' either awakens from a sleep mode (reduced power state that is less than fully powered) or is turned fully ON to control the display 14. In particular, opening the door 32 triggers the switch 34 that causes a signal 36 to be sent from the input 24 to the processor module 37, which in turn sends a signal 38 to the timer circuit 20 to turn the controller 19 and thus the display 14 ON.

Advantages of the embodiments include being able to use lesser grade and less expensive components in an IED for outdoor use. Also, considerable energy savings are realized due to powering OFF the controller 19 or backlight 16 when not in use.

The operations and algorithms described herein can be implemented as executable code within the processor module 37 having a processor circuit 42, or stored on a standalone computer or machine readable non-transitory tangible storage medium that are completed based on execution of the code by a processor circuit implemented using one or more integrated circuits. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit can be implemented, for example, using a non-volatile memory such as a programmable read only memory (PROM) or an EPROM, and/or a volatile memory such as a DRAM, etc.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An assembly comprising:
   a cabinet having an interior and a door movable between open and closed positions to gain access to the interior,
   an intelligent electronic device (IED) disposed within the interior of the cabinet and comprising:
   inputs, accessible on the IED, providing electrical connections to the IED for devices that may be separate from the IED,
   pushbuttons constructed and arranged to provide user input to the IED,
   a display module including a display and a component associated with the display, and
   a timer circuit associated with the component of the display module, the timer circuit being constructed and arranged to power the component OFF or place the component in a reduced power state when not in use after a certain amount of time, and
   a switch associated with the door and electrically connected to at least one of the inputs so that when the component is powered OFF or in the reduced power state, and when the door is opened, the switch is constructed and arranged to cause a signal to be sent to the timer circuit to cause the timer circuit to power the component fully ON,
   wherein the switch is a mechanical switch, an optical switch or a capacitive switch,
   wherein the IED is constructed and arranged to send a signal to a control center that is remote from the IED when an unauthorized user opens the door.

2. The assembly of claim 1, wherein the component is a backlight for the display.

3. The assembly of claim 1, wherein the component is a controller.

4. The assembly of claim 1, further comprising a processor module electrically connected with the timer circuit, wherein the pushbuttons are electrically connected with the processor module such that when the component is powered OFF or in the reduced powered state, activation of any of the pushbuttons sends a signal to the processor module and the processor module sends a signal to the timer circuit to cause the timer circuit to power the component fully ON.

5. The assembly of claim 2, wherein the display is a liquid crystal display.

6. The assembly of claim 1, wherein the cabinet is constructed and arranged to be used in an outdoor environment.

7. The assembly of claim 1, wherein the optical switch is a photocell.

8. The assembly of claim 1, wherein the IED is a protection and control relay for electrical distribution.

9. A method of controlling power to an intelligent electronic device (IED), the method comprising the steps of:
   providing the IED in a cabinet, the cabinet having a door to gain access to the IED, the IED being provided to comprise inputs, accessible on the IED, providing electrical connections to the IED for devices that may be separate from the IED, pushbuttons constructed and arranged to provide user input to the IED, and a display module including a display and a component associated with the display,
   causing the component to power OFF or to be in a reduced power state when not in use after a certain amount of time, and when the component is powered OFF or in the reduced power state, causing the component to power fully ON upon opening of the door of the cabinet,
   wherein a switch is associated with the door and is electrically connected to at least one of the inputs, and wherein the step of causing the component to power fully ON includes the switch, upon opening of the door, causing a signal to be sent to a processor module of the IED that sends a signal to a timer circuit, with the timer circuit causing the component to power fully ON,
   wherein the switch is a mechanical switch, an optical switch or a capacitive switch,
   wherein the IED is to send a signal to a control center that is remote from the IED when an unauthorized user opens the door.

10. The method of claim 9, wherein the component is a backlight for the display or is a controller for the display, and wherein the timer circuit enables the step of causing the component to power OFF or be in the reduced power state.

11. The method of claim 9, wherein the pushbuttons are electrically connected with the processor module and thus the timer circuit, and the method further comprises:
    when the component is powered OFF or in the reduced power state, activating of any of the pushbuttons to send a signal to the processor module and thus to the timer circuit to cause the timer circuit to power the component fully ON.

12. The method of claim 9, wherein when the component is a backlight, the display is provided as a liquid crystal display.

13. The method of claim 9, further comprising the step of:
    placing the cabinet with the IED therein in an outdoor environment.

14. The method of claim 9, wherein the optical switch is a photocell.

15. The method of claim 9, wherein the IED is provided as a protection and control relay for electrical distribution.

16. A method of controlling power to an intelligent electronic device (IED), the method comprising the steps of:
    providing the IED in a cabinet, the cabinet having a door to gain access to the IED, the IED being provided to comprise inputs, accessible on the IED, providing electrical connections to the IED for devices that may be separate from the IED, pushbuttons constructed and arranged to provide user input to the IED, and a display module including a display and a component associated with the display,
    causing the component to power OFF or to be in a reduced power state when not in use after a certain amount of time,
    when the component is powered OFF or in the reduced power state, causing the component to power fully ON upon opening of the door of the cabinet, and
    sending a signal to a control center that is remote from the IED when an unauthorized user opens the door.

* * * * *